(12) United States Patent
De Souza

(10) Patent No.: US 8,573,234 B2
(45) Date of Patent: Nov. 5, 2013

(54) PROCESS AND SYSTEM FOR REMOVING PRINTING IN METALLIC PACKAGES

(75) Inventor: Valmir Zacarias De Souza, Jundiai (BR)

(73) Assignee: Crown Embalagens Metalicas da Amazonia S.A., Manaus-AM (BR)

( * ) Notice: Subject to any disclaimer, the term of this patent is extended or adjusted under 35 U.S.C. 154(b) by 383 days.

(21) Appl. No.: 12/979,598

(22) Filed: Dec. 28, 2010

(65) Prior Publication Data

US 2011/0088730 A1 Apr. 21, 2011
US 2012/0103372 A2 May 3, 2012

Related U.S. Application Data

(62) Division of application No. 12/675,553, filed as application No. PCT/BR2008/000210 on Jul. 21, 2008.

(30) Foreign Application Priority Data

Aug. 31, 2007 (BR) .................................... 0703769

(51) Int. Cl.
*B08B 1/04* (2006.01)
*B08B 3/02* (2006.01)

(52) U.S. Cl.
USPC ................... 134/48; 134/55; 134/61; 134/93; 134/133; 134/198; 101/37; 101/40; 101/40.1; 101/62

(58) Field of Classification Search
USPC .............. 134/48, 55, 61, 93, 94.1, 95.3, 133, 134/134, 198; 101/37, 40, 40.1, 62
See application file for complete search history.

(56) References Cited

U.S. PATENT DOCUMENTS

| | | | |
|---|---|---|---|
| 3,960,073 A * | 6/1976 | Rush ............................... | 101/40 |
| 4,643,840 A * | 2/1987 | Brocklehurst et al. ........ | 510/207 |
| 5,085,999 A | 2/1992 | Bowers-Irons et al. | |
| 5,584,944 A * | 12/1996 | Bershas et al. ................ | 148/246 |
| 5,694,852 A * | 12/1997 | Bressler et al. ............ | 101/401.1 |
| 6,755,202 B1 * | 6/2004 | Scholey et al. ................ | 134/69 |
| 6,878,215 B1 | 4/2005 | Zimmerman, Jr. | |
| 6,929,702 B1 | 8/2005 | Motsenbocker | |

OTHER PUBLICATIONS

International Search Report from PCT/BR2008/000210 mailed Nov. 10, 2008
Written Opinion of the International Searching Authority from PCT/BR2008/000210 mailed Nov. 10, 2008.
United States Patent and Trademark Office, Office Action for U.S. Appl. No. 12/675,553, filed Apr. 10, 2013, 7 pages, USA.

* cited by examiner

*Primary Examiner* — Saeed T Chaudhry
(74) *Attorney, Agent, or Firm* — Alston & Bird LLP

(57) ABSTRACT

Process and system for removing printing in metallic packages used in drinks, food and other applications in general, comprising the removal of ink before the cure thereof, by means of spray with ink remover liquid and non abrasive friction. Preferably, said liquid is an alkaline aqueous solution, which is sprayed onto the package surface simultaneously with the friction thereof with a soft and non abrasive element. In a preferred embodiment, said friction results in the rotation of the package around the longitudinal axis thereof, which is mounted on a rotative support, and the soft non abrasive element in contact with the surface thereof keeps motionless.

4 Claims, 1 Drawing Sheet

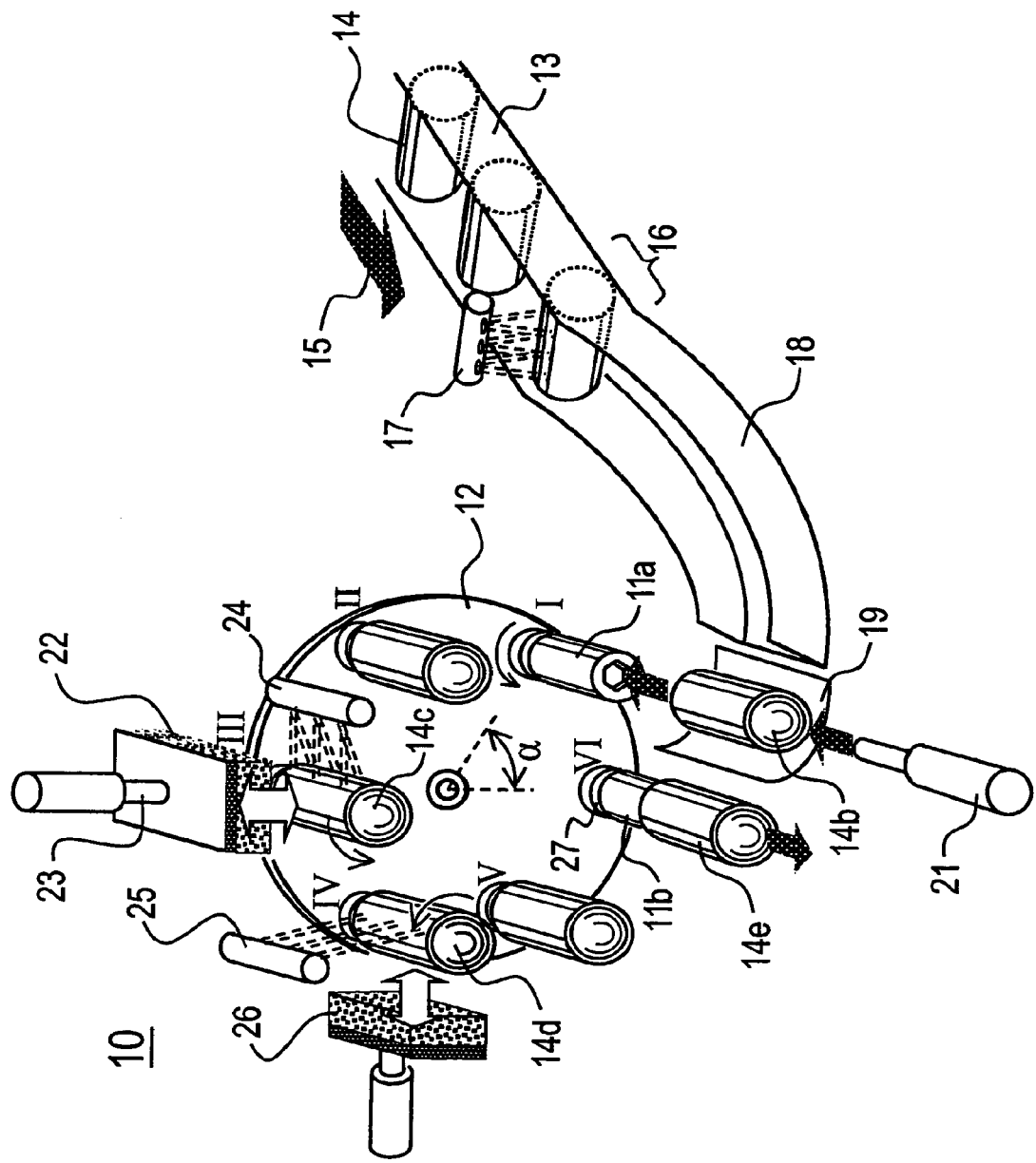

PROCESS AND SYSTEM FOR REMOVING PRINTING IN METALLIC PACKAGES

CROSS-REFERENCE TO RELATED APPLICATIONS

This application is a divisional of, and claims the benefit of, U.S. Nonprovisional application Ser. No. 12/675,553 entitled "Process and System for Removing Printing in Metallic Packages" and filed Feb. 26, 2010, which is incorporated herein by reference in its entirety and is a national stage application, filed under 35 U.S.C. §371, of International Application No. PCT/BR2008/000210 and filed Jul. 21, 2008, which is incorporated herein by reference in its entirety and claims the benefit of Foreign Application No. BR/PI0703769-4, filed Aug. 31, 2007.

FIELD OF THE INVENTION

The present invention refers to the cleaning of metallic cans on which body there are printed labels and, more particularly, to the cans for food, beverages and other applications in general.

BACKGROUND OF THE INVENTION

The increasing technological development stimulates and challenges the evolutive progress of society, thus enlarging the capacity of storage, processing and transformation of the information into knowledge. Such fact is observed in view of the necessity of innovating whenever we face a certain obstacle and/or problem, it requiring an effective solution which unites rapidity, objectivity, productivity and an excellent cost/benefit relation.

The use of metallic packages for the storage of various products is generalized practice, specially in relation to the packages of food, beverages and other applications in general that are retailed. These packages shall have a distinctive look presentation in order to attract the consumer's attention, helping him, at the same time, in the selection of the desired product. The resource nowadays adopted to reach such objectives consists of printing labels in several colors, directly on the metallic surface of these packages. Therefore, there were developed inks and automatized specific processes, which allow a production volume of the order of million of units per day.

One such process and related equipment is described by Rush in U.S. Pat. No. 3,960,073 "Machine for decorating two-piece cans", in which a sequence of operations are performed at a plurality of work stations fixed about the outer circumference of a vertically arranged supporting indexing table. The cans are conveyed to the machine and inserted on mandrels which are arranged around the rim of said indexing table. The mandrels holding the cans rotate about their individual axes, and the table is rotated in discrete forward and stop motions, which bring the cans to a plurality of work stations where they are coated with a base coating of UV-polymerizable plastic resin followed by several printing stations in which different coloured resins are applied by means of a offset printing process. Between said stations, the cans are brought in front of ultra-violet dryer stations, where the UV radiation polymerizes and cures the several layers of plastic resin.

Such printing techniques present satisfactory results in almost all cases. However, the high production volume—which, in the case of drink cans, can reach 6 million units per day—causes even a relatively low percentage of inappropriate printings to result in a considerable volume of waste, in absolute terms. Upon considering the losses that occur during the adjustment of the printing equipment, the number of rejected units is of the order of 1,000,000 per month.

Upon considering that, in the case of the drink cans, the body weighs about 12 grams, the waste estimate can reach 18 tons per month of aluminum, of which recycling is imposed due to the value of this metal. Traditionally, this recycling has been carried out by returning the cans as scrap to the aluminum works, wherein the material is casted and reused. Nevertheless, the casting process consumes electric energy which can be harmful to environment. From the point of view of the industries that produce these packages, it is further necessary to consider the charges arising from the administrative expenses and the material conveying costs.

The removal of the ink from the cans is, therefore, a recommendable alternative, it making the operation of the industries involved in the process more profitable. However, the removal by organic solvents presents a negative impact to the environment, and it can cause penalties such as fine up to a possible interdiction of the operations. On the other hand, the printing process requires the application of the ink onto a flat surface, thereby making impracticable the techniques of ink removal by means of abrasion. Moreover, in processes comprising the polymerization between stations in which ink is applied—such as described in U.S. Pat. No. 3,960,073—removal by solvent becomes unfeasible. Therefore, many plants do not use the printing process described above. Rather, the curing step is performed in a separate machine or oven, coming after all the printing steps have been performed. Between the end of the ink applying process and the curing oven the quality of the printing can be verified and the misprinted cans may be diverted to a printing-removal device, the operation of which preserves the polished surface of the cans which can thereafter be returned to the production line.

OBJECTIVES OF THE INVENTION

In view of the foregoing, the present invention aims to provide printing removal means in metallic packages, so as to avoid the expenses associated with the recovery of the material by melting.

It is another objective of the invention the provision of means which, besides efficiently removing the printing from the metallic cans, preserve the structure and the surface finishing thereof so as to allow the return of said cans to the production line without requiring any further processing.

It is another objective of the invention to provide means which reduce the impact on environment, as well as resulting in saving of electric power which would be needed for melting the scrap cans.

BRIEF DESCRIPTION OF THE INVENTION

As the processes adopted in the industries of this branch, the labeling of cans comprise a first step in which the ink is applied on the surface by typographical process such as offset of the like, followed by the passage of such cans through furnaces to provide the cure of the ink by heat. Such cure results in a strong adhesion of the ink to the metal, which is necessary in view of the conditions of use of the cans, that comprise, besides the handling to which they are subjected during commercialization and consumption, the contact with the moisture arising from cooling, etc.

In the proposed process, the aforementioned objectives, as well as other ones, are reached through the removal of printing before curing the ink, by means of application of a liquid that removes ink associated with friction by non-abrasive means.

Although several previous art documents describe ink-removal processes, the process of the present invention embodies some original features which were not foreseen by said documents. For instance, U.S. Pat. No. 4,643,840 to Brockenhurst relates to aqueous paint stripping compositions, which are spread as a layer over the painted surface to be stripped. Said compositions comprise skin-forming promoters, said skin having tear strength sufficient for it to be separated and removed from the underlying surface carrying with it the paint which has been softened by the action of an alkali comprised in said composition. While these compositions do not damage the surface from which the paint has been stripped, they are not adequate for high-speed processes which characterize the beverage can production, due to the fact that they are applied as a layer up to 3 mm thick and the skin formation demands a period of time between one to six hours, as mentioned on lines 18-19, column 6 of said patent document. Therefore, notwithstanding the fact that these compositions comprise an alkali, they do not anticipate the use of a sprayable liquid and its immediate removal, still in liquid form, by non-abrasive friction means.

According to another feature of the invention, the ink remover liquid consists of an alkaline aqueous solution.

According to another feature of the invention, the pH of the solution is equal or greater than 9.

According to a more preferred embodiment of the invention, the remover liquid consists of a sodium hydroxide alkaline aqueous solution.

According to another feature of the invention, the remover liquid may consist of an oil-in-water dispersion.

According to another feature of the invention, said friction is provided by means of the relative movement between the printed surface of the metal and a non-abrasive frictioning cushion.

According to another feature of the invention, said friction is simultaneous with the application of the remover liquid.

According to another feature of the invention, in a preferred embodiment in which the cans have cylindrical shape, said friction is provided by the contact of a cushion with the surface of a can which is rotated around its longitudinal axis.

According to another feature of the invention, the equipment employed comprises at least one rotating mandrel, in which the can is temporarily engaged and retained during the friction operation.

According to another feature of the invention, the retention of the can in said mandrel is preferably provided by means of vacuum or even by equivalent means.

According to another feature of the invention, a detector capable of identifying the presence of leftover printing may be coupled to said equipment.

DESCRIPTION OF THE FIGURE

The other advantages and characteristics of the invention will become more evident from the description of a preferred embodiment, provided by way of example and not in a sense of limitation, and from the single FIGURE related thereto, in which it is depicted the equipment as well as the process proposed herein.

DETAILED DESCRIPTION OF THE INVENTION

The object of the present invention is to provide the cleaning conditioning cans for beverages, food and other applications in general, wherein possible printing errors have occurred in the body thereof. The said object is reached by means of a process in which the ink is removed before the cure thereof, by remover liquid spray and non-abrasive friction. The remover liquid employed is preferably an alkaline solution having a pH equal or greater than 9; advantageously, this liquid consists in a solution of sodium hydroxide in water, in a concentration ranging from 0.1% to 1.5% of NaOH, it being preferred a concentration of about 0.2% NaOH, nevertheless, other substances that are appropriate to the proposed end may be used. Said spray may be carried out in one or more steps, wherein at least one of them is associated to friction of the printed surface by means of a cushion of soft and non-abrasive material. In the depicted exemplifying embodiment, three spray steps are used, wherein the two last ones are simultaneous with said friction.

According to the principles of the invention, the equipment used in the process comprises means that hold the can in appropriate position, besides providing the rotation of the can around its longitudinal axis, non-abrasive friction means in contact with the lateral printed surface thereof during said rotation and spray means of the remover liquid on this surface during said friction. In a practical embodiment manner of the invention, said supporting means are provided by cylindrical mandrels having a diameter lightly lower than the inner diameter of the cans, which are engaged thereto through axial sliding. Said mandrels are associated to mechanisms that produce rotation around the axles thereof. Due to the fact that the cans are temporarily retained in said mandrels, they also spin around their axes, thereby providing the sliding contact of the printed surface with said friction means which remain stationary while sliding over said surface. The combined action of the sliding and the solvent liquid provides the removal of ink from the surface of the cans, without affecting the polished finishing of the surface, allowing the return of the cans to the production line after rinsing and drying.

Notwithstanding the fact that said mandrels can be oriented vertically or horizontally, the horizontal position is preferred, since it makes easier the engagement and disengagement of the cans. The treatment of the cans is carried out by a main apparatus which comprises the following essential elements:

a) at least one mandrel comprising means of rotation around the axis thereof;

b) means for sliding insertion of the cans, one at a time, in the mandrels;

c) means for retaining the can in the mandrel after the sliding insertion thereof;

d) at least one element for spraying the ink remover liquid;

e) at least one soft non-abrasive friction element associated to means for the juxtaposition thereof to the printed surface of the can inserted in the rotating mandrel;

f) means for withdrawing the can from the mandrel after the printing removal.

Complementarily, the system comprises accessory apparatuses, the first one conveying the printed cans up to the printing removal equipment and the second one providing the rinsing of the already treated cans and directing them back to the production line.

An advantageous embodiment of the invention which improves the efficiency of the process consists in using a plurality of mandrels, regularly placed in the edge of a rotating base that moves in increments equal to the angular distance between said mandrels, with dwell pauses between the successive displacements. Such embodiment allows that some of the above-mentioned elements, such as (b), (d), (e) and (f), can be installed in distinct positions, in order to enable the simultaneous execution of several steps of the process.

More specifically, such elements are placed in positions coinciding with those of the cans in the dwell points between said displacements.

FIG. 1 depicts an embodiment of the invention in which said main apparatus 10 comprises six mandrels 11 having horizontally oriented axles, equidistantly arranged along the periphery of a vertical disk-shaped round supporting plate 12, the angle α between adjacent mandrels being equal to 60°. The incremental displacement of disk 12 are, therefore, equal to 60°, that is, ⅙ of a circle, the dwell points being designated in the FIGURE as I, II, III, IV, V and VI. As shown in the FIGURE, the cans are conducted up to said apparatus through a gutter 13, wherein the cans to be treated are positioned in parallel to each other and perpendicularly to the displacement direction indicated by arrow 15. Above position 16 in said gutter, there are provided means for momentarily retaining each can, the can being sprayed with a solvent liquid applied by a first sprinkler 17. Then, the can slides through the most inclined portion 18 of the gutter, stopping at positioning device 19 which arranges the can 14b in a position corresponding to the dwell point I of the disk, said can being aligned with mandrel 11.

As illustrated in the FIGURE, the means that produce the sliding insertion of the can onto the mandrel consist of a piston 21 located in this position, which pushes the can so that it externally engages in the mandrel. The piston drive is made through known means, such as compressed air or the like. After the engagement, the can is retained in the mandrel by means of vacuum application, through known means which have not been illustrated in the FIGURE. As previously mentioned, the mandrel rotates around the longitudinal axis thereof, said rotation being provided by known means that have not been detailed in the FIGURE.

After two successive displacements of 60°, the can 14c engaged in the mandrel reaches position III, where it is subjected to a first ink removal operation, through spray with the remover liquid, it being concomitantly rubbed by the soft cushion 22, the apposition to and withdrawal from the can surface thereof are controlled by piston 23, which is driven by known means, such as compressed air or the like. More precisely, the resting position of cushion 22 is that illustrated in the FIGURE, that is, away from the can. Immediately after the can 14c reaches position III, piston 23 is driven, approaching the soft cushion 22 to the surface of the rotating can until it is contact thereto, the can being continuously sprayed by the remover liquid from spray 24, while said cushion remains motionless, i.e., not rotating. At the end of the dwell period of the disk, the cushion 22 is withdrawn from the can, and the can is displaced up to position IV, where spray and friction are applied once more, through the sprinkler 25 and the cushion, which is constituted by the soft sponge 26. After this second step of removing the printing ink, two more displacements of the disk bring the can to positions V and VI. When the can 14e reaches position VI, it is expelled from mandrel 11b by compressed air or some equivalent means, being directed to a rinsing, drying and conveying apparatus back to the production line (not illustrated).

Even though the invention has been described based on a specific exemplary embodiment, it should be understood that variations can be made thereto without departing from the spirit of the invention. Thus, for example, the main equipment 10 can be provided from a different number of mandrels, such as 3, 4, 5 or more mandrels, remaining within the inventive concept. Likewise, the supporting plate 12 may be polygonal (triangular, square, pentagonal, hexagonal, etc.), instead of circular as illustrated. Furthermore, the number of sprinklers or sponges can be different from the two shown in the FIGURE, said cushions remaining motionless during the time they are in sliding contact with the can surfaces, provided the latter are shaped as circular cylinders. In the case the cans are not cylindrically shaped the relative movement between the printed surface and the soft cushion can be provided by keeping the can motionless and moving the cushion along it, such option being more functional in the case of cans having non-circular sections, such as oblong, elliptical or prismatic.

What is claimed:

1. System for removing printing in metallic packages of beverages, food and other applications in general, said system comprising a main apparatus comprising a movable supporting plate along which periphery there are mounted a plurality of equidistantly placed rotating mandrels in which said metallic packages are temporarily positioned and retained via at least one piston, the movement of said supporting plate comprising the intermittent rotation along an angle equal to the distance between adjacent mandrels, each rotation step being separated by the following one by a dwell time, a plurality of work stations being arranged externally to the periphery of said supporting plate and placed at the dwell points of said intermittent rotation, wherein at least one said work station comprises spraying means for simultaneously spraying said packages with ink-removing liquid and rubbing the rotating surface of said packages by a non-abrasive element which is kept motionless during said rubbing operation, said spraying and rubbing operations being performed within said dwell time.

2. System, as claimed in claim 1, wherein said system comprises means for juxtaposing said non-abrasive element to said surface during said dwell time, and drawing said non-abrasive element away from said surface at the end of said dwell time.

3. System, according to claim 1, wherein said package consists of a cylindrical can.

4. System, according to claim 3, wherein said system comprises ink-removing liquid spraying means placed in a feeding gutter of said packages before the processing thereof by said main apparatus.

* * * * *